United States Patent [19]
Rhoads et al.

[11] Patent Number: 5,627,672
[45] Date of Patent: May 6, 1997

[54] CONTROLLABLE OPTICAL PERIODIC SURFACE FILTERS AS A Q-SWITCH IN A RESONANT CAVITY

[75] Inventors: Charles M. Rhoads, Plano; Gary Frazier, Garland; Richard G. Hoffman, II; Oren B. Kesler, both of Plano, all of Tex.; Daniel J. Ryan, Sycamore, Ill.

[73] Assignee: Texas Instruments Incorporated, Dallas, Tex.

[21] Appl. No.: 453,328

[22] Filed: May 30, 1995

Related U.S. Application Data

[63] Continuation of Ser. No. 23,989, Feb. 26, 1993, abandoned.
[51] Int. Cl.$^6$ ................................................ G02F 1/03
[52] U.S. Cl. .................................... 359/248; 372/12
[58] Field of Search ............................ 359/243, 244, 359/248; 372/12

[56] References Cited

U.S. PATENT DOCUMENTS

| | | | |
|---|---|---|---|
| 3,919,669 | 11/1975 | Hartemann | 333/30 |
| 4,092,442 | 5/1978 | Agnihotri et al. | 427/41 |
| 4,300,811 | 11/1981 | Ettenberg et al. | 350/1.1 |
| 4,342,036 | 7/1982 | Scott et al. | 343/836 |
| 4,894,526 | 1/1990 | Bethea et al. | 250/211 |
| 4,910,523 | 3/1990 | Huguenin et al. | 342/179 |
| 5,119,231 | 6/1992 | Nelson et al. | 359/359 |
| 5,130,718 | 7/1992 | Wu et al. | 343/781 |
| 5,208,603 | 5/1993 | Yee | 343/909 |
| 5,268,785 | 12/1993 | Crenshaw et al. | 359/244 |
| 5,311,360 | 5/1994 | Bloom et al. | 359/572 |

OTHER PUBLICATIONS

*Diffractive Infrared Filters Fabricated by Electron-beam Lithography*, Dale M. Byrne, SPIE vol. 560 Diffraction Phenomena in Optical Engineering Applications (1985), pp. 70–81.

*Infrared Mesh Filters Fabricated by Electron-beam Lithography*, D.M. Byrne, et al. J. Vac. Sci Technol. B, vol. 3, No. 1, Jan./Feb. 1985. pp. 268–271.

*Analysis of Scattering from Frequency-Selective Surfaces in the Infrared*, Thomas Schlmert, et al. J. Opt. Soc. of Am. vol. 7, No. 8/Aug. 1990. pp. 1545–1553.

*Mid-Infrared Filters Using Conducting Elements*, Charles M. Rhoads, et al. Applied Optics/vol. 21, No. 15. Aug. 1982. pp. 2814–2816.

*Techniques for Analyzing Frequency Selective Surfaces—A Review*, Raj Mittra, et al. Proceedings of the IEEE, vol. 76, No. 12. Dec. 1988.

*Extreme Selectivity in the Lift-Off of Epitaxial GaAs Films*, Eli Yablonovitch, et al. Appl. Phys. Lett 51 (26), 28 Dec. 1987. pp. 2222–2224.

Primary Examiner—Georgia Y. Epps
Assistant Examiner—Thomas Robbins
Attorney, Agent, or Firm—Dana L. Burton; James C. Kesterson; Richard L. Donaldson

[57] ABSTRACT

Generally and in one form of the invention this is a periodic surface filter comprising at least one element at a surface of the filter and electronic controls to change the optical characteristics of the element. The surface filter is used as a switchable filter in a cavity for a Q-switch.

8 Claims, 5 Drawing Sheets

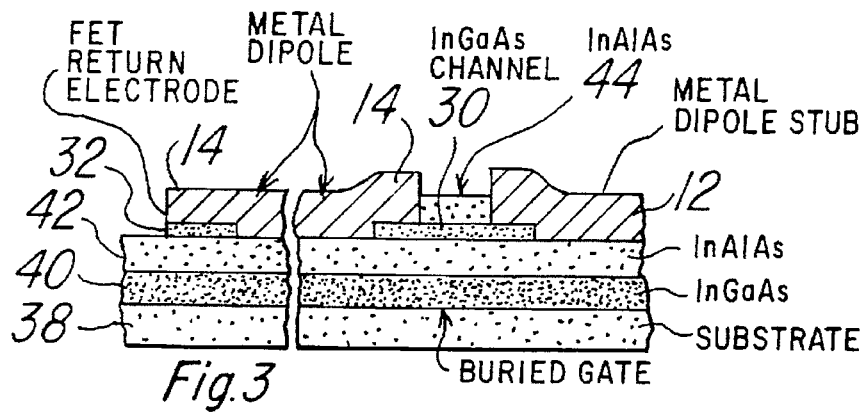
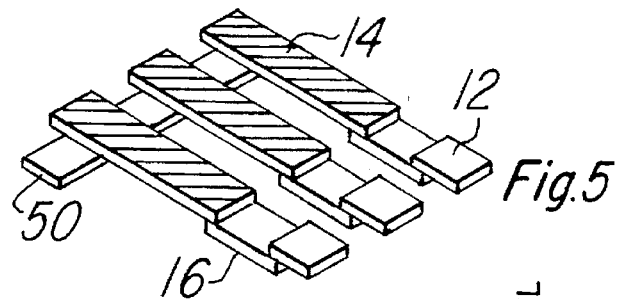
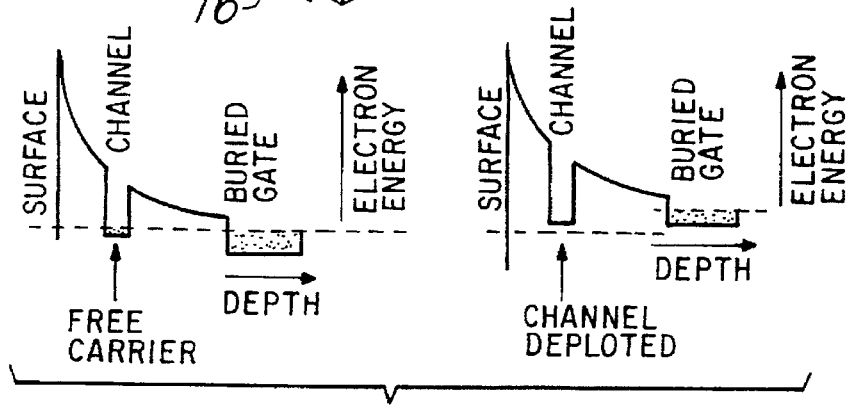
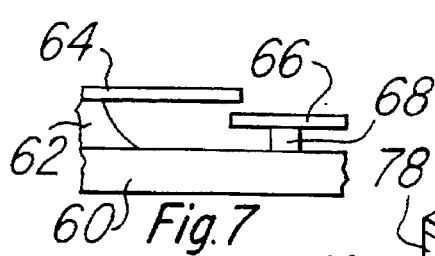
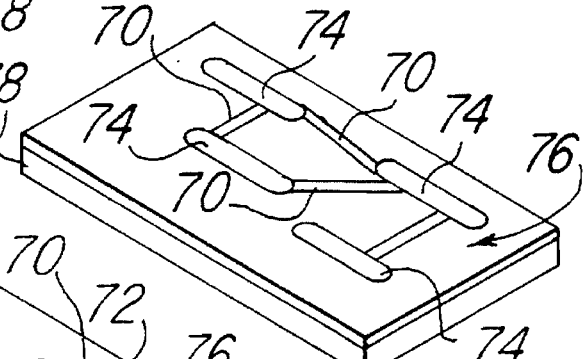
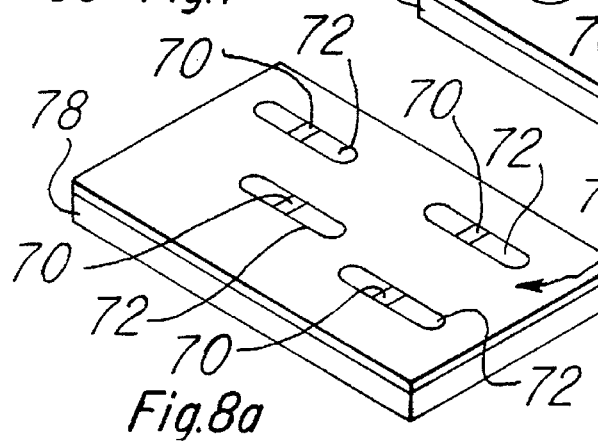

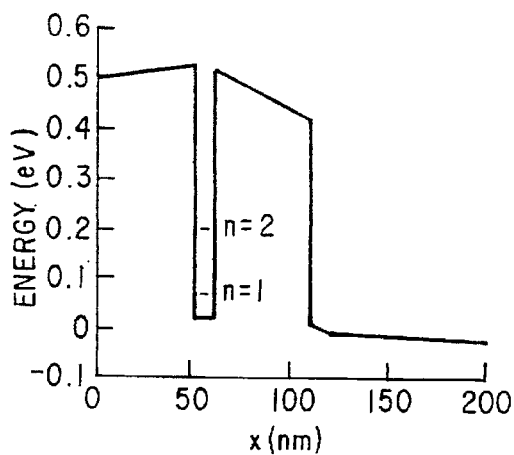 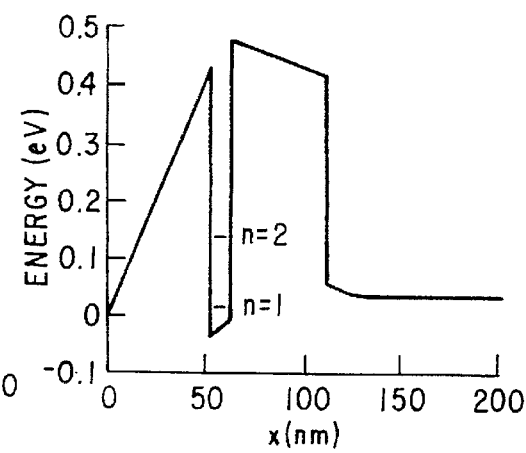
Fig.11a    Fig.11b
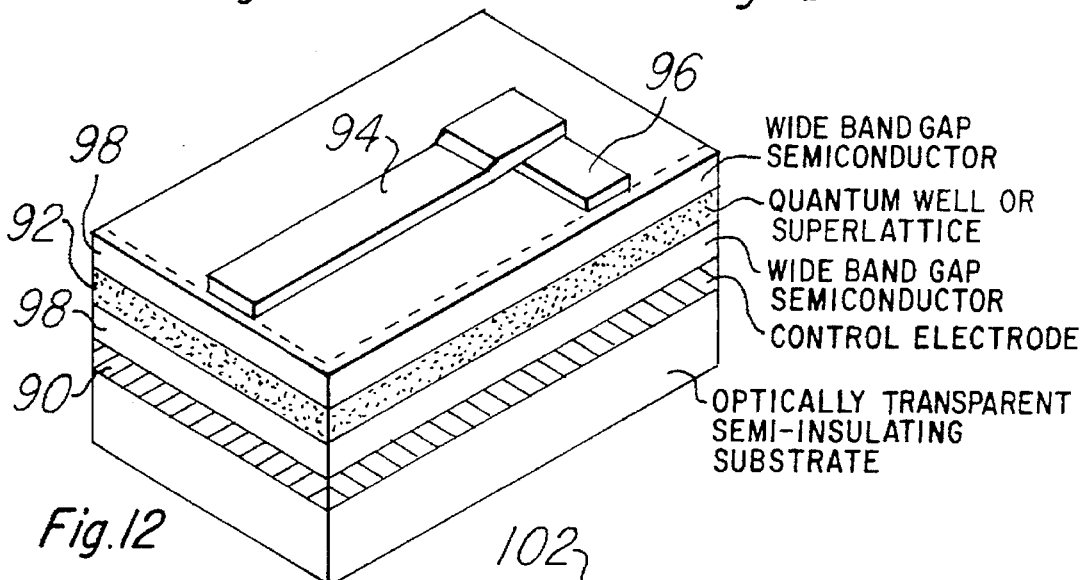
Fig.12
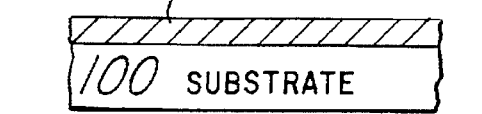
Fig.13a
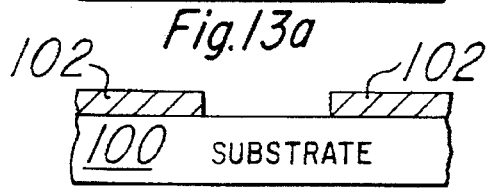
Fig.13b
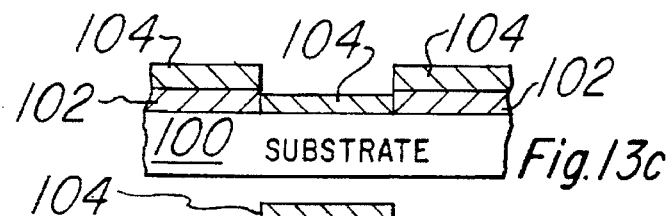
Fig.13c
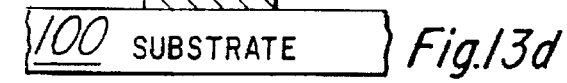
Fig.13d

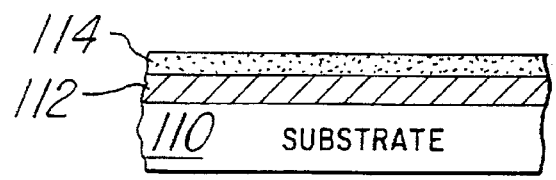
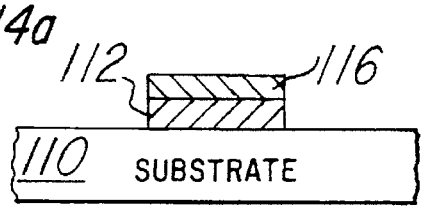
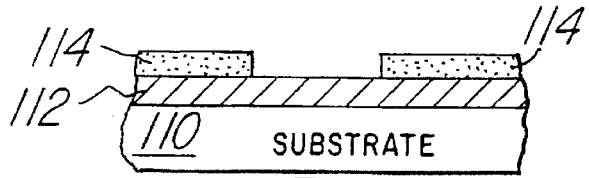
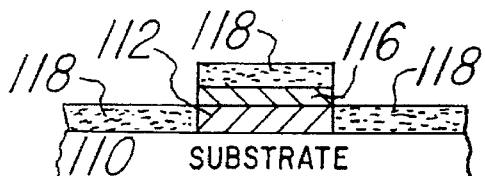
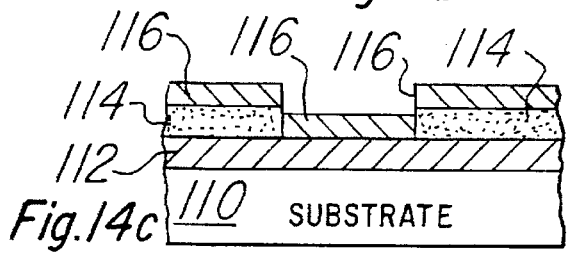
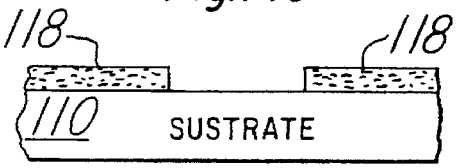
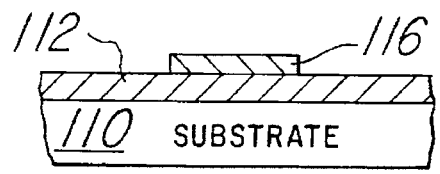
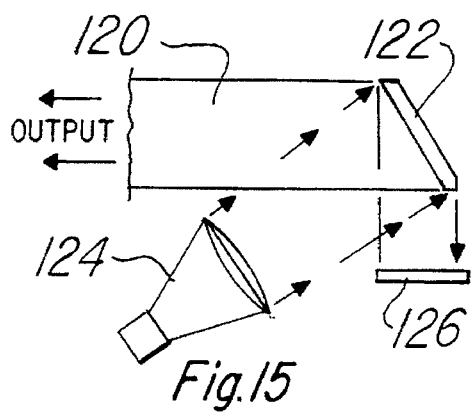
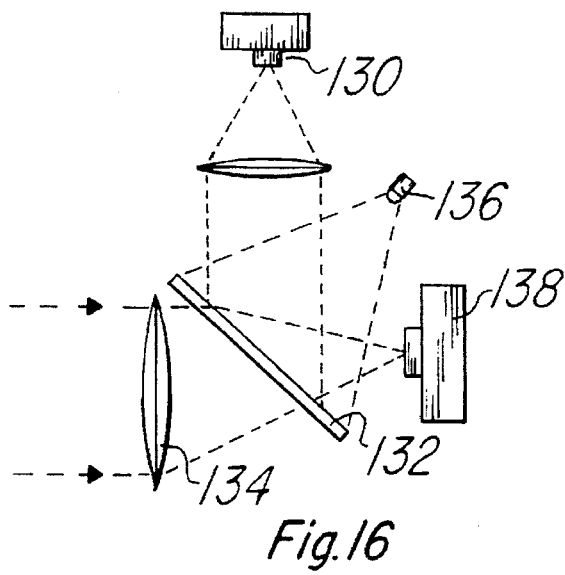

CONTROLLABLE OPTICAL PERIODIC SURFACE FILTERS AS A Q-SWITCH IN A RESONANT CAVITY

This is a Continuation, of application Ser. No. 08/023,989, filed Feb. 26, 1993 now abandoned.

FIELD OF THE INVENTION

This invention generally relates to periodic surface filters.

BACKGROUND OF THE INVENTION

Without limiting the scope of the invention, its background is described in connection with Frequency Selective Surfaces (FSS). The term, periodic surfaces, is used to describe a broad range of objects which include everything from periodic arrays of antennas and apertures to optical diffraction gratings, at wavelengths from microwave to X-ray. One type of surface is the wire grid, useful for filters and polarizers. Periodic surface filters, also known as Frequency Selective Surface (FSS) are a further development of wire grid technology. They are composed of appropriately shaped conductors in thin layers on a dielectric substrate. The spacing between elements in the layers can be less than a wavelength. In the optical wavebands, this results in transmission of a single diffraction order, instead of the multiple orders transmitted by larger early technology.

IR filters can be made using conducting surfaces composed of Frequency Selective Surfaces (FSS). Most prior developments are for fixed frequency structures (i.e. the resonance or resonances, giving either bandpass or bandreject frequency characteristics, cannot be time varied or modulated or tuned).

SUMMARY OF THE INVENTION

It is herein recognized that a need exists for controllable optical periodic surface filters where the resonant frequency may be altered. The present invention is directed toward meeting those needs.

Generally, and in one form of the invention, a periodic surface filter is presented comprising at least one element at a surface of the filter and electronic controls to change the optical characteristics of the element. Preferably, one or more electronic switches alter the electrical and optical coupling of the element or an electronically tunable electro-optic material alters the resonant frequency of the element.

In another form of the invention a Q-switch is presented comprising a substrate and a periodic surface filter on the substrate, whereby the periodic surface filter serves as a switchable mirror for a cavity.

In yet another form of the invention a staring system is presented comprising a detector; an objective lens; a reference; a switching light source; and a periodic surface filter, whereby the filter serves as a shutter for the system.

In still another form of the invention a method of forming a capacitive periodic surface filter array is presented comprising the steps off forming a mask layer on a substrate; patterning the mask layer to expose a portion of the substrate; forming a metal layer on the patterned mask layer and the exposed portion of the substrate; and removing the patterned mask layer and the metal layer over the patterned mask layer.

In another form of the invention a method of forming an inductive periodic surface filter array is presented comprising the steps off forming a first mask layer on a substrate; forming a second mask layer on the first mask layer; patterning the second mask layer to expose a portion of the first mask layer; forming a first metal layer on the patterned second mask layer and the exposed portion of the first mask layer; removing the patterned second mask layer and the first metal layer over the patterned second mask layer; removing the first mask layer in regions not covered by the first metal layer thereby exposing portions of the substrate; forming a second metal layer over the first metal layer and the exposed portions of the substrate; and removing remaining portions of the first mask layer and the first metal layer and the second metal layer over the first mask layer.

BRIEF DESCRIPTION OF THE DRAWINGS

In the drawings:

FIG. 3 is a sectional view of the integration of a field-effect transistor with a capacitive frequency selective surface;

FIG. 5 is a top view of a set of capacitive frequency selective surface elements interconnected by doped semiconductor bus lines;

FIG. 6 is the conduction band edge diagram of a field-effect transistor with a capacitive frequency selective surface in both conducting and non-conducting switching states;

FIG. 7 is a sectional view of the integration of a Deformable Mirror Device with a frequency selective surface;

FIG. 8a–b are sectional views of the integration of photoconductors with a frequency selective surface;

FIGS. 11(a) and (b) are calculated conduction band edge diagrams for a single quantum well resonator tuned to the 8 to 12 micrometer wavelength band;

FIG. 12 is a sectional view of one element in a capacitive frequency selective surface integrated with a buried quantum well resonator;

FIGS. 13(a)–(d) are sectional views of the sequence of steps required to fabricate a capacitive frequency selective surface pattern;

FIGS. 14(a)–(g) are sectional views of the sequence of steps required to fabricate an inductive frequency selective surface pattern;

FIG. 15 is an embodiment using a frequency selective surface as a Q-switch; and

FIG. 16 is an embodiment using a frequency selective surface as a shutter.

Corresponding numerals and symbols in the different figures refer to corresponding parts unless otherwise indicated.

DETAILED DESCRIPTION OF PREFERRED EMBODIMENTS

Figure 1A:
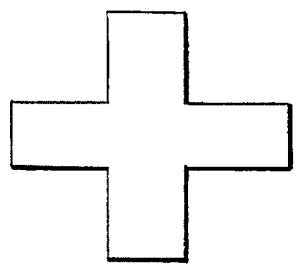
FIGS. 1a–d show several FSS grid element shapes.
Figure 1B:
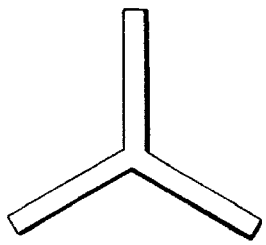
Figure 1C:
Figure 1D:
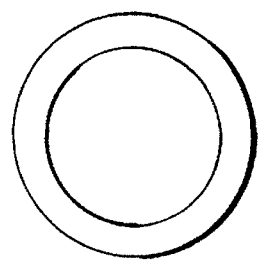

The present invention is based on periodic surface filter, also known as Frequency Selective Surface (FSS), technology. Construction of FSS's is a mature technology for microwave applications, where she wavelengths are long enough to use large feature sizes. As the integrated circuit fabrication technology for making small openings in conductive layers, or conductive features on dielectric layers has improved, applications to the optical wavebands have become possible. Today those technologies can support feature sizes useful in the infrared, providing an alternative to other filter designs. Recent developments in quantum or nano-electronics make it feasible to add tunability to FSS's. As the capability for making smaller electronic components improves a number of possibilities become practical. One of these is the possibility of making an electronically tunable FSS.

An FSS is a resonant device much like an antenna and therefore can be made relatively broadband and angle insensitive. The FSS can be designed to be a bandpass or bandreject filter with either polarized or unpolarized transmittance/reflectance characteristics. It is often desirable to form filter structures which can be switched or tuned in the sense of shifting the device resonant frequency ($f_o$) or turning the bandpass or bandreject characteristics on or off.

FIGS. 1a–d shows some examples of FSS grid elements. The linear element is polarization selective whereas the other elements are independent of polarization. Generally, the feature size of the element determines the resonant frequency. The unit cell area tends to define the resonant Q or the bandpass or bandreject widths.

The basic ideas involved with making tunable periodic filters are to be able to control the effective geometry of the features or layer structure, or the dielectric constant of the component materials. For instance, the basic design of a transmission bandpass FSS is a conductive layer with a periodic array of holes (features), on top of a dielectric, and coated with optical anti-reflection coatings. The wavelengths passed are a function of the effective feature size. One way of changing the wavelength is therefore to arrange switches to change the size/shape of the holes. With appropriate switching, the holes may be "shorted", reducing the transmission to almost zero. Another way of varying the transmission is to use a photoconductive substrate under the feature layer, or a set of switches actuated by photoconductivity, then exposing to the correct wavelength and intensity of control light.

Resonant transmission bandpass FSS devices may consist of 1 or more metallic layers of slot or metal elements arrayed in a periodic 2 dimensional lattice surrounded by 1 or more layers of dielectrics. The dielectrics can be doped and/or patterned semiconductors.

Resonant transmission bandreject filters can be formed by using similar dielectric stacks along with dual metallic structures (i.e. metal to non-metal and non- metal to metal). Thus the FSS ends up looking like arrays of disconnected metallic elements generically referred to as "dipoles" although multi-polarization elements can be used (holes, cross-dipoles, tripoles, etc.). Appropriate grating lobe conditions need to be met for "good" performance whether transmission bandpass or bandreject in function.

In the FSS filter or structure the resonant frequency is basically proportional to the electrical length of the elements (slots, dipoles, holes, dots, etc). Thus the resonant frequency of the FSS may be changed by changing the electrical length of the elements. This can be accomplished most simply in two ways: change the physical element length, or change the electrical parameters of the materials surrounding the elements. Alternatively, a third technique is to provide an impedance load somewhere along the element and shift the impedance in some prescribed fashion.

Note that the switching (on/off) function can be obtained by moving the resonance out of the desired frequency band or converting part of the dielectric to a high conducting state. The latter condition is possible with appropriately biased semiconductors. Several methods add tunability to the basic FSS in a monolithic, electronically tunable structure. A band switched filter characteristic can be supplied by electronic reconfiguration of the patterned antenna structure, while fine tuning or band sweeping can be accomplished by electronically adjusting the material properties of the antenna array substrate. The present invention offers FSSs that provide band-switched and band-swept capability for both reflective and transmissive applications. Band switching may be accomplished using integrated active switches that alter the coupling between FSS antenna elements. Band sweeping may be accomplished by integrating electrically tunable electro-optic materials into the FSS substrate.

In a first preferred embodiment of a tunable FSS one or more field-effect transistor (FET) devices are used to alter the effective optical length of a fixed pattern FSS resonator. The digital on-off action of the FET devices will produce discrete changes in the FSS resonance so as to provide a band-switched FSS resonator. The schematic structure of this embodiment is shown in FIG. 2a–c where field effect transistors (FETs) are used to join or isolate regions of capacitive (dipole) patterned antenna structure, in FIG. 2a, and inductive (slot) patterned antenna structure, in FIG. 2c.

Figure 2A:
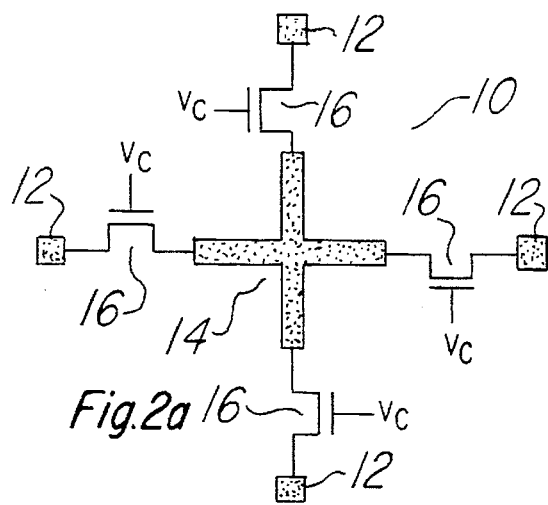
FIG. 2a–c are schematic diagrams and an electrical model of tunable frequency selective surfaces wherein field-effect transistors are used to switch the optical resonance of a combination of frequency selective elements.

To form a band-switched "capacitive" FSS resonator 10 as shown in FIG. 2a, antenna stubs 12 are provided near the ends Df a crossed dipole pattern 14, and are linked by an equal number of FET switches 16. A sufficient bias potential applied to the gate inputs of the FET devices 16 will produce an electrically conducting bridge between the dipoles 14 and their respective end stubs 12, so as to effectively extend the optical length of the crossed dipole resonator 10. When the FET gates 16 are unbiased, the device channel resistance will be very high and electrically and optically isolate the crossed dipoles and their respective end stub elements. The electrical model for this structure is shown in FIG. 2b. In the condition where the FET devices 16 are in their respective "off" states, the main crossed-dipole antenna elements 14 and the end stubs 12 are isolated, and a shorter overall wavelength resonance is obtained. In the condition where the FET devices 16 are in their respective "on" states, the main crossed-dipole antenna elements 14 and the end stubs 12 are connected, and a longer overall resonance wavelength is obtained.

Figure 2C:
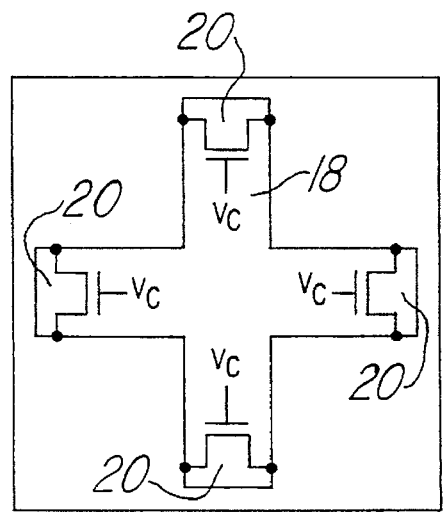
Figure 2B:
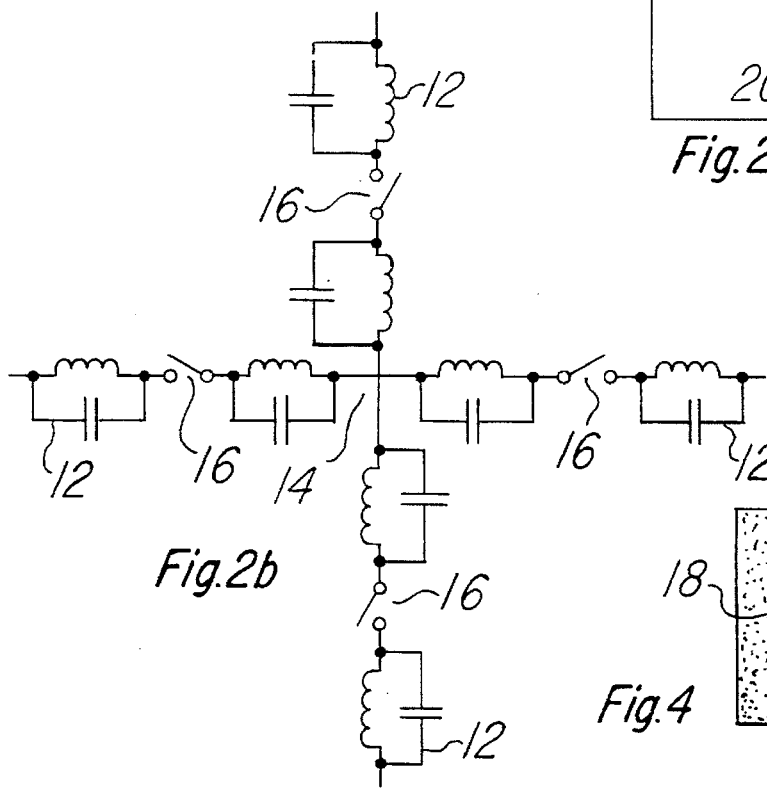

To form a band-switched "inductive" FSS resonator as shown in FIG. 2c, the lithography negative of the crossed dipole pattern is produced in a uniform conducting sheet so as to form a crossed-dipole slot pattern 18, and FET devices 20 are used to provide electrical and optical shorts across the slot pattern. For this type of resonator, turn-on of the FET devices 20 effectively shortens the dipole slot pattern 18 by providing a shorting bridge across the inner dimensions of the FSS pattern. Turn-off of the FET devices 20 eliminates the shorting actions of the FET channels, and the resonance of the slot pattern 18 is determined by its total physical length. The basic concept can also be extended to various patterned antenna structures including both capacitive and inductive arrays consisting of single dipoles or slots, tripoles and tri-slots, and mixtures of different capacitive and inductive patterns.

A preferred method of integrating FSS patterns with FET switches is shown in FIG. 3. In this embodiment, InGaAs is preferably used to form the channel 30 of the respective FET switches 16 and a uniformly doped conducting layer is placed below the FSS pattern 12,14 to serve as a gate control electrode 32, and FET channel regions 30 are formed to control the conductivity of the FET channels. FIG. 3 shows the basic layout of one such FET integrated with a dipole patterned antenna structure 14 to create a variable-length resonator. The active switch is placed in the gap between the end of the main dipole element 14 and its respective metal stub 12. Both metal structures 12,14 are in ohmic contact with the semiconductor channel 30. The device preferably has a buried InGaAs gate 40 on a substrate 38 with a layer 42 of InAlAs between the gate 40 and the channel 30 and a layer 44 of InAlAs over the channel 30.

Figure 4:
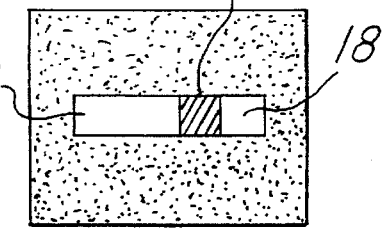
FIG. 4 is a top view of a field-effect transistor integrated with an inductive frequency selective surface.

The integration of FET switches 20 with inductive (slot) FSS patterns 18 is accomplished using a similar structure and method, by forming the FET 20 channel perpendicular to the axis of the slot dipole pattern 18, by forming ohmic contact to the FET channel at the inner edges of the slot pattern, and by forming an underlying uniformly conducting sheet below the FSS and FET channel structures to serve as a control gate electrode. FIG. 4 shows the top view of an FET structure 20 applied to a slot FSS 18 structure.

The correct operation of the FET switches in altering the optical resonance of the FSS pattern requires that the electrical potential of the FET channels be at a defined potential with respect to their respective control gate potentials. When the FSS pattern is in the form of an inductive slot pattern, the patterned antenna structure is electrically contiguous across its surface, and a preferred method to set the FET channel bias is to directly contact the FSS pattern at its periphery and apply bias to establish the electrical potential of the FET channels. However, capacitive FSS patterns are discontinuous, and some means must be supplied to bus all FET channels to a common electrical contact. This bus is preferably supplied by adding a patterned conductive semiconductor layer, an undercoat, directly underneath the FSS antenna elements as shown in FIG. 5 ( buried control gates are not shown). These semiconductor bus lines 50 are interconnected at the periphery of the FSS pattern 14 using semiconductor or metal interconnects, and finally contacted and biased to set the potential of the FET 16 channels. Alternatively, a preferably thin (approximately 5 nanometers thick) layer of platinum or nickel or gold metal can be deposited over the FSS pattern so as to electrically interconnect the separate FSS dipole elements 14. In this method, the apparent optical thickness of the metal overcoat must be made less than the FSS resonant wavelength. Thin metal or semiconductor layers can be used for this purpose while remaining highly transparent to infrared radiation.

FIG. 6 shows how electrical bias between the FET 16 channel bus and the buried common gate layer will electrically switch the transistor between off (insulating) or on (conducting) states. With no bias applied to the underlying gate 40, both the gate 40 and channel 30 layers will contain free electrons. The electrons in the channel 30 will connect the dipole 14 and stub 12 increasing its effective length. With a negative bias applied to the gate 40, the potential of the channel 30 in the gap will be raised above the Fermi level as referenced to the surface, depleting it of electrons and breaking the connection to the stub 12.

Detailed modeling may be used to define the doping levels, bias conditions, and geometry's needed to maximize the optical effect of FET switching. As an example, initial calculations show that the use of InAlGaAs heterostructures can produce sub-micrometer sized transistors with the required conductance/isolation characteristics at infrared frequencies. The optical frequency of 10-micrometer radiation is approximately 30 teraHertz (THz). This oscillation rate corresponds to a cycle period of 33 femtoseconds, and indirectly determines the minimum channel doping required in the FET structures to produce an electrically and optically conducting channel at this wavelength. For the semiconductor to respond to this wavelength, the channel doping is preferably greater than $5 \times 10^{18}$ cm$^{-3}$ with a mobility of about 1000 cm$^2$/Vs. This level of doping is can be routinely achieved using InGaAs compounds.

In an alternate embodiment, the FETs described above may be replaced with other switching devices, for example Deformable Mirror Devices (DMD). One example of a structure using a DMD is shown in FIG. 7, however many embodiments, using different types of DMDs and different structural arrangements, may be used to achieve essentially the same purpose. There are varying types of DMDs and methods of fabrication. Examples of these may be found in "Deformable-Mirror Spatial Light Modulators", Larry J. Hornbeck, Proceedings of SPIE, Volume 1150, August 1989. In FIG. 7, a DMD is shown having a beam 64 attached to a substrate 60 by a spacer 62. Generally, there is also address circuitry (not shown) on the substrate 60 to control movement of the beam 64. The FSS element may be formed directly on the beam 64 and the beam 64 may be electrostatically moved to connect to a fixed stub 66. This serves to extend the optical length as described in the FET embodiment above. The fixed stub 66 may be supported and attached to the substrate in many ways, for example, a post 68 may be used as shown, or the entire stub 66 could contact the substrate 60. If desired, the spacing between the contacting points of the beam 64 and the stub 66 may be varied with controlled bias to yield a variable capacitance or variable load impedance in embodiments utilizing the DMD.

In another alternative embodiment, the FETs may be replaced with photoconductors 70, or the photoconductive properties of the substrate 78 itself may be used. As an example, photoconductors 70 may be placed to form a conduction path across the slots 72 for a bandpass FSS, shown in FIG. 8a, or to form conduction path between the elements 74 to form a bandstop FSS, shown in FIG. 8b. A light source 76 of suitable wavelength may be used to control the photoconductors. FIGS. 8a and 8b represent a cross-section of an FSS. The shape and number of elements may vary. If the substrate 78 photoconductive property is utilized, the control light source 76 generates carriers in the substrate 78 itself to form the appropriate conduction paths.

In another preferred embodiment of a tunable FSS, electrical modulation of the dielectric properties of the FSS substrate to smoothly shift the resonant characteristic of the FSS patterned antenna structure is used. In general, modulations of the substrate index of refraction ($n_0$) shifts the effective length ($L_{EFF}$) of the antenna elements according to the relationship shown in Equation 1 below:

$$L_{eff}^{elk} L_0 \sqrt{\frac{n_s^2 + n_0^2}{2}}$$

where:

$L_0$ is the physical length of the major axis of the antenna elements, $n_s$ is the index of refraction of the FSS substrate, $n_0$ is the index of refraction of either the air or passivation layer on top of the antenna elements.

Moreover, variations in the optical extinction coefficient (k) will affect both the FSS bandpass wavelength and overall optical absorption.

Figure 9:
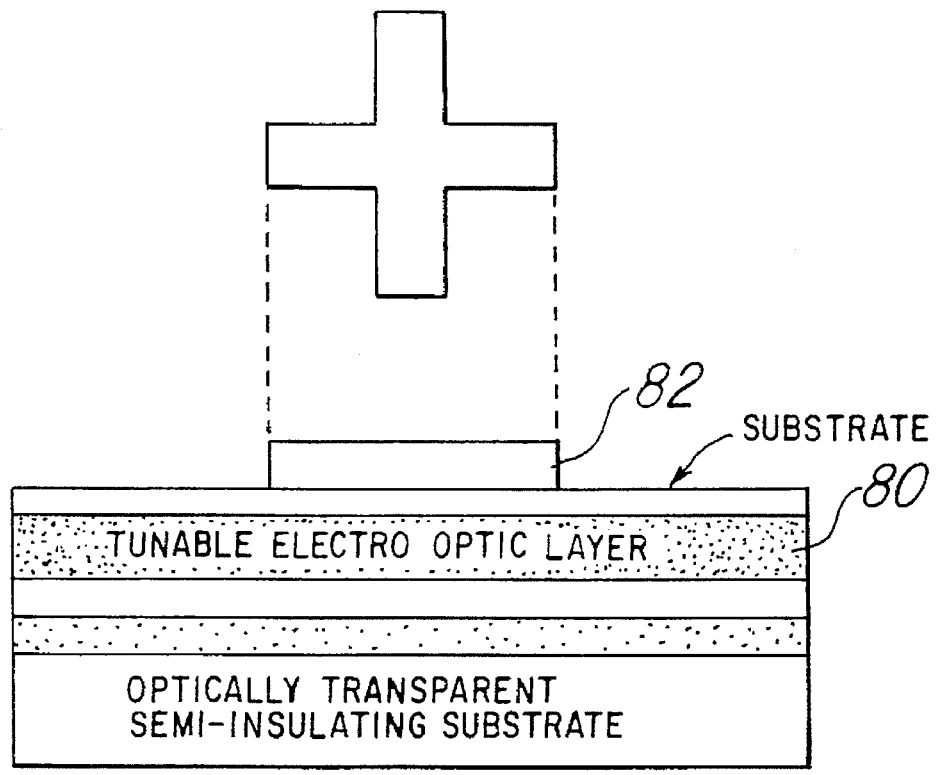
FIG. 9 is a sectional view of one element of a capacitive frequency selective surface integrated with a tunable electro-optic layer and control electrode.

In the a preferred embodiment to provide a smoothly tunable FSS resonator, an electro-optic (EO) material 80 is embedded at or near the FSS patterned antenna structure 82 as shown in FIG. 9. Electrical bias across this layer will modulate the dielectric characteristic of the layer and therefore the optical environment of the FSS elements. The EO layer 80 interacts strongly with the complex electromagnetic fields near the antenna elements 82 so that smooth changes in bias voltage produce smooth shifts in the resonant characteristic of the FSS. Preferably the electro-optical layer 80 is composed of a heterostructure superlattice which is constructed to be nearly optically resonant with the resonant characteristics of the FSS antenna elements.

Figure 10:
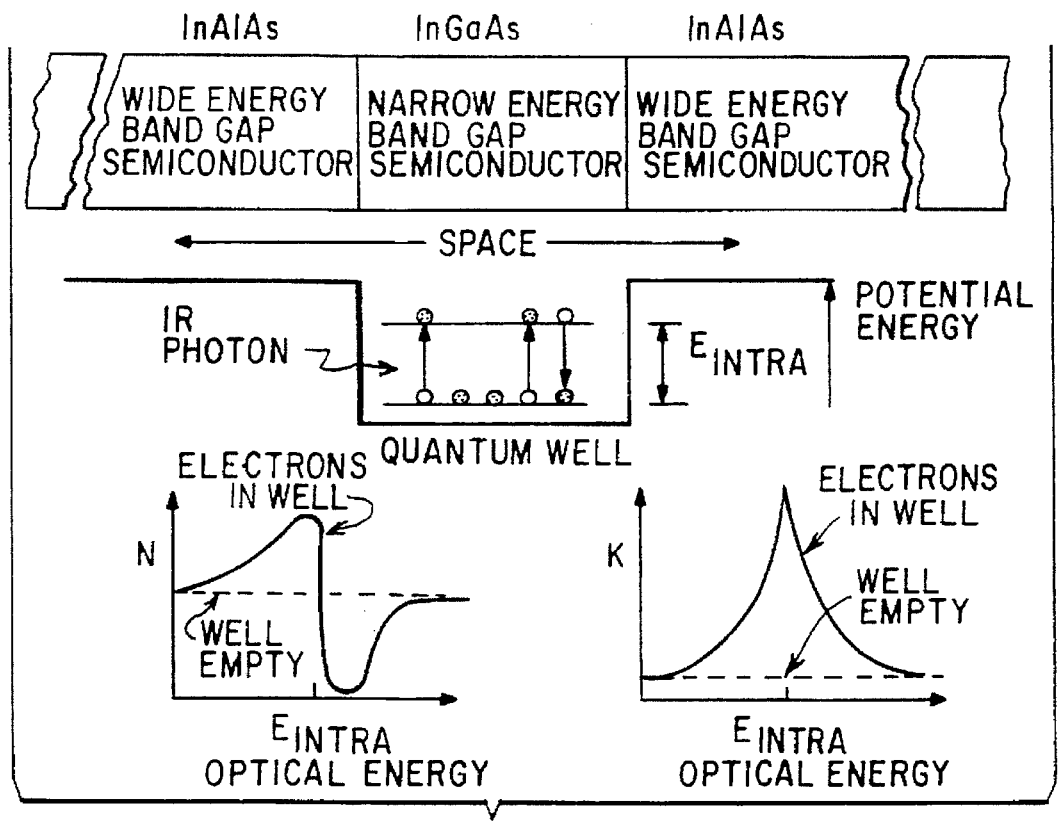
FIG. 10 is a heterostructure and conduction band edge diagram and optical properties diagram for a single quantum well resonator.

Normally, the electro-optic response of bulk semiconductors is rather small at infrared wavelengths. However, as shown in FIG. 10, quantum-confinement effects can produce strong variations in n and k over selected wavelengths. A quantum-confining potential well is formed by sandwiching a narrow-band-gap material such as InGaAs between two wide-band-gap materials such as InAlAs. The semiconductor layers are grown by molecular beam epitaxy (MBE), metal-organic chemical vapor deposition (MOCVD), or other epitaxial process. The potential energy well formed by the InAlAs barriers and intermediate InGaAs layer forms discrete electronic states that have strong oscillator strengths in the infrared region. Alternatively, repeated growth of thin wide-gap and narrow-gap semiconductors can produce a superlattice structure that displays similar variations in optical constants near intra-band energies.

Adding or removing electrons from an optically resonant quantum-well structure will cause large variations in n and k near the intra-band ($E_{intra}$) energy. Placing either a quantum-well or resonant superlattice near the FSS elements can then dramatically alter the FSS resonant wavelength according to Equation 1 above. Strong EO effects in quantum well structures have been well studied for use in lasers, EO modulators, and recently in infrared detector arrays.

The quantum-well width is selected to control the energy state separation between the n=1 and n=2 energy states. This is done such that the population or de-population of electrons from the n=1 ground state produces the MAXIMUM modulation of the index of refraction of the overall structure at the center resonant wavelength of the FSS patterned antenna structure. Shown in FIG. 11a-b is the computed energy band diagram for the preferred heterostructure to be used for tuning a FSS pattern that is tuned to the 8- to 12-micrometer wavelength band. The structure preferably has the material and dimensional parameters detailed in Table 1, and is fabricated by conventional MBE or MOCVD methods.

TABLE 1

| THICKNESS (nm) | MATERIAL | DOPING |
|---|---|---|
| 50 | InAlAs | Undoped |
| 11.5 | InGaAs | Undoped Quantum Well |
| 50 | InAlAs | Undoped |
| 100 | InGaAs | $2 \times 10^{18}$ cm$^3$ |

In this example, the quantum-well width is 11.5 nm, giving an inter-subband energy separation of 124 meV, appropriate for 10-micrometer optical absorption.

Two conditions are required to use the nonlinear optical properties of the quantum well to shift the resonant characteristic of the FSS patterned antenna structure: the electric field of the incoming electromagnetic radiation must have a component aligned perpendicularly to the plane of the quantum well, and the quantum-well ground state must be populated with electrons. Electromagnetic diffraction within the FSS produces a surface field that can couple strongly with the quantum-well states, and electrical bias can be used to add or remove electrons from the quantum-well structure. The strength of FSS-well coupling is determined by the Bragg condition:

$$d \sin \theta = \frac{m \lambda}{n}$$

where d is the element spacing

θ is the angle between the direction of propagation of the incident electromagnetic radiation to the FSS surface normal m is the order of the diffraction λ is the wavelength of the electromagnetic radiation n is the refractive index.

This coupling is a free parameter and is controlled by the FSS antenna geometry and distance between the FSS and the underlying quantum well layer or layers.

FIG. 12 shows a sectional view of an FSS where the substrate incorporates a single quantum-well heterostructure resonator. The correct operation of the underlying quantum well resonator in altering the optical resonance of the FSS pattern requires that the electrical potential of both sides of the quantum well heterostructure be at defined potentials. A buried control electrode 90, preferably InGaAs, is used to fill or deplete the quantum-well layer 92, preferably InGaAs, with electrons. Preferably a wide bandgap semiconductor layer 98 of InAlAs is on either side of the quantum well (or superlattice) layer 92.

When the FSS pattern 94 is in the form of a inductive slot pattern, the patterned antenna structure is electrically continuous across its surface, and the preferred method to set the quantum well bias is to directly contact the FSS pattern 94 at its periphery and apply bias to the FSS 94 and the buried control electrode 90. However, capacitive FSS patterns are discontinuous, and some means must be supplied to provide bias across the quantum well layer 92 to deplete or populate the ground state of the quantum well. This bias is preferably supplied by adding a bus electrode 96 to the FSS pattern 94, directly underneath the FSS antenna elements in the manner previously shown in FIG. 5. These bus lines 96 are preferably doped semiconductor lines that electrically interconnect all of the FSS antenna elements. The individual bus lines 96 are interconnected at the periphery of the FSS pattern 94 using semiconductor or metal interconnects, and finally contacted and biased to set the potential of the quantum well layer 92. Alternatively, a preferably thin (5 nanometers thick) layer of platinum or nickel or gold metal can be deposited over the FSS pattern so as to electrically interconnect the separate FSS dipole elements. In this method, the apparent optical thickness of the metal overcoat must be made less than the FSS resonant wavelength. Thin metal or semiconductor layers can be used for this purpose while remaining highly transparent to infrared radiation.

A single resist lift-off metallization technique may preferably be used to fabricate capacitive (dipole-tripole) arrays. Inductive (slot) arrays may preferably be fabricated with a double- lift-off, metal-on-polymer process. Other fabrication methods, such as ion milling and reactive-ion metal etching (RIE) may also be used. FSS arrays having less than 0.1-micrometer antenna features are producible by the preferred processes.

FIG. 13a–d shows a single-resist lift-off-process that may be used to fabricate capacitive antenna structures. Controlled molecular weight polymethylmethacrylate (PMMA) 102 is preferably spun on the selected substrate 100 (FIG. 13a) and exposed, using, preferably electron-beam lithography (FIG. 13b). The PMMA 102 may be developed using a 1:1 solution of methyl-isobutyl-ketone (MIBK) and isopropyl alcohol. A thin film of metal 104, typically gold or aluminum, is then preferably evaporated over the patterned resist 102 and exposed substrate 100 (FIG. 13c). Lift-off removal of the remaining PMMA 102 and metal 104 above it may be accomplished using acetone immersion (FIG. 13d). This process will produce an array of uniform antenna elements on the surface of the chosen substrate.

The fabrication of inductive grids requires a slightly more complicated process. In principle, the same process as used to fabricate capacitive grids could be used by replacing PMMA with negative electron beam resist. However, the sidewalls of the developed negative resist are typically not vertical and would not be suitable for lift-off. A double-lift-off, metal-on-polymer process, shown in FIG. 14a–g, is a preferable alternative to a negative resist process. Polyamide 112 is preferably spun on the selected substrate 110, followed by a layer of PMMA 114 (FIG. 14a). The next three steps (FIGS. 14b–d) are preferably identical to the capacitive grid process, resulting in a metal pattern 116 of the inductive slots on top of the polyamide layer 112. The metal pattern 116 may serve as an etch mask when, as an example, an $O_2$ plasma transfers the pattern to the polyamide 112 (FIG. 14e). A final metal layer 118 is preferably deposited (FIG. 14f), followed by removal of the remaining polyamide 112 and metal 116,118 above it, using, for instance, immersion in methylene chloride (FIG. 14g).

Modern crystal-growth techniques such as molecular-beam epitaxy (MBE) allow the atomic layer control of semiconductor layer thickness, doping, and semiconductor composition. Altering the semiconductor composition between adjacent semiconductors also alters the band gap between layers. This allows a precise engineering of the electron potential energy in the growth direction.

Advanced epitaxial techniques for growing heterostructure devices on GaAs, InP, and Si substrates have been established. Both MBE and metal-organic MBE processes are available for AlGaAs/GaAs, InAlGaAAs/InGaAs, InGaP/GaAs, InP/inGaAs, and Si/CaF$_2$/Ge/Al single-crystal growth. The InAlAs/InGaAs system is particularly useful for this work owing to its advantageous band alignments in quantum well structures. This system can also support the heavy doping that will be required to build infrared FET switches.

High-resolution patterning on InAlGaAs compounds is possible through the use of reactive-ion etching. For example, a highly anisotropic RIE process based on boron trichloride ($BCl_3$) may be used. This process may also be used to etch the power busses that may be needed in the band-switched FSS design. There are also several standard processes for forming ohmic contacts at metal-InAlGaAs layers. All these processes are compatible with gold or aluminum FSS antenna element designs.

Some of the advantages of the tunable array filters include: Electrical switching for high-speed operation; high reliability (i.e., no moving parts); lightweight and compact; fast band switching and potentially high integrated transmission.

A Q-switch for a laser may be constructed by using a FSS 122 preferably on GaAs as a switchable mirror for the cavity. This is done by allowing the cavity 120 be in the pump mode with the FSS 122 transmitting. The FSS 122 is then switched rapidly by exposing the GaAs to a short, intense pulse of light, from source 124, at a short enough wavelength to generate photoconductive electrons. Laser light is then reflected to a mirror 126, which forms one end of the cavity, and the cavity depopulates in the Q-switched pulse. An example of a FSS Q-switch in a laser cavity is shown in FIG. 15. In an alternate embodiment, the FSS may be switched by using FETs at each opening to short the opening for the output pulse.

Another potential use of the switched FSS 132 is for a shutter for a staring system. FIG. 16 illustrates its potential use to expose the entire array 138 to a reference 130. Assume, for example, an uncooled detector array 138 with 8–12 µm energy focused on it by the objective lens 134. This type of detector requires a reference 130 to compare the signal to. If a FSS beamsplitter 132 is used, as shown, in its switched off state it will pass the 8–12 µm energy if the substrate is a suitable dielectric, such as GaAs, for example. In order to switch the FSS 132 to the on (reflective) state in the 8–12 µm waveband, the switching light source 136 illuminates the openings in the FSS 132. If the wavelength of the switching light source is shorter than that equivalent to the bandgap in the substrate (µ0.85 µm in GaAs), the photoelectric effect will generate conduction band electrons in the FSS 132 openings, shorting them out, and making the surface reflective. The energy from the reference 130 then floods the array 138. Alternately, the FSS may be switched by using FETs at each opening.

The spatially controllable characteristic over the surface of these filters in addition to the waveband controllabity gives additional preferred embodiments. "Solid-state" (non-mechanical) optical scanners is one application. In a preferred embodiment, an image plane scanner could be made by placing the filter in an image plane, and only passing light from certain pixel areas at a time. Another preferred embodiment is for specialized polarizers, where the angle, and amount of polarization is controllable. The present invention may be applied to various types of spatial filters. Specific uses include aperture shaping filters. Spatial control of the filter can be made to control phase, allowing wavefront correction/control. Still another set of potential embodiments is to use the filter as a light modulator for communications or optical processing. Spatial control at a small enough scale may allow switching/modulation at the micrometer size features.

The present invention may be used as a replacement for an opto-mechanical shutter, as shown in FIG. 16, such as is used with uncooled sensor sights. Use of the electronically switchable filter would reduce the size and weight, increase the reliability, and possibly give an increase in the flexibility of operation. It may be used as a Q-switch in a laser as shown in FIG. 15. It may serve as a bandpass filter whose instantaneous bandpass may be moved which would be useful for spectral analysis of sensor data, as an example. It could be used as a filter for blocking hazardous wavelengths from a sensor, possibly where the threat wavelength is moving.

As is obvious, from the examples above, the present invention has many potential uses. The above list of embodiments is in no way meant to be exhaustive or limiting. It is provided to show the broad range of uses for the present invention.

A preferred embodiment has been described in detail hereinabove. It is to be understood that the scope of the invention also comprehends embodiments different from those described, yet within the scope of the claims. Words of inclusion are to be interpreted as nonexhaustive in considering the scope of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A Q-switch comprising:
   a. a substrate; and
   b. a surface filter on said substrate, wherein said surface filter is a switchable mirror for a cavity such that said surface filter is switched rapidly by exposure to a pulse of light at a wavelength to generate photoconductive electrons.

2. The Q-switch of claim 1, wherein said Q-switch is a subsystem of a laser.

3. The Q-switch of claim 1, wherein one or more optically sensitive field effect transistors switch said surface filter.

4. The Q-switch of claim 1, wherein said periodic surface filter is switched using a control light source to activate photoconductors in said filter.

5. The Q-switch of claim 1, wherein said surface filter is periodic.

6. A Q-switch comprising:
   a. a substrate; and
   b. a surface filter on said substrate, wherein said surface filter is a switchable mirror for a cavity such that said surface filter is switched rapidly by electronic control.

7. The Q-switch of claim 6, wherein said electronic control comprises at least one electronic switch.

8. The Q-switch of claim 7, wherein said electronic switch is a field effect transistor.

* * * * *